No. 643,095. Patented Feb. 6, 1900.
S. L. HOLDREGE.
MAGNETO ELECTRIC LIGHTING APPARATUS FOR BICYCLES.
(Application filed June 30, 1898. Renewed Jan. 15, 1900.)
(No Model.) 2 Sheets—Sheet 1.
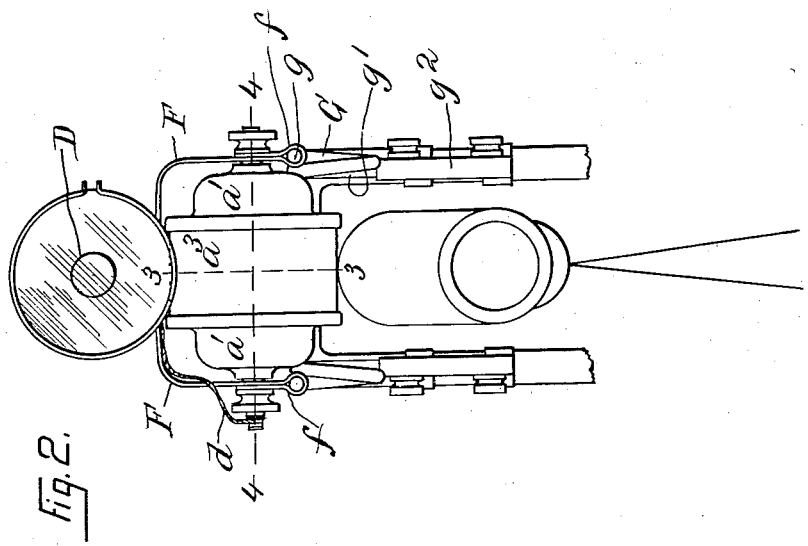
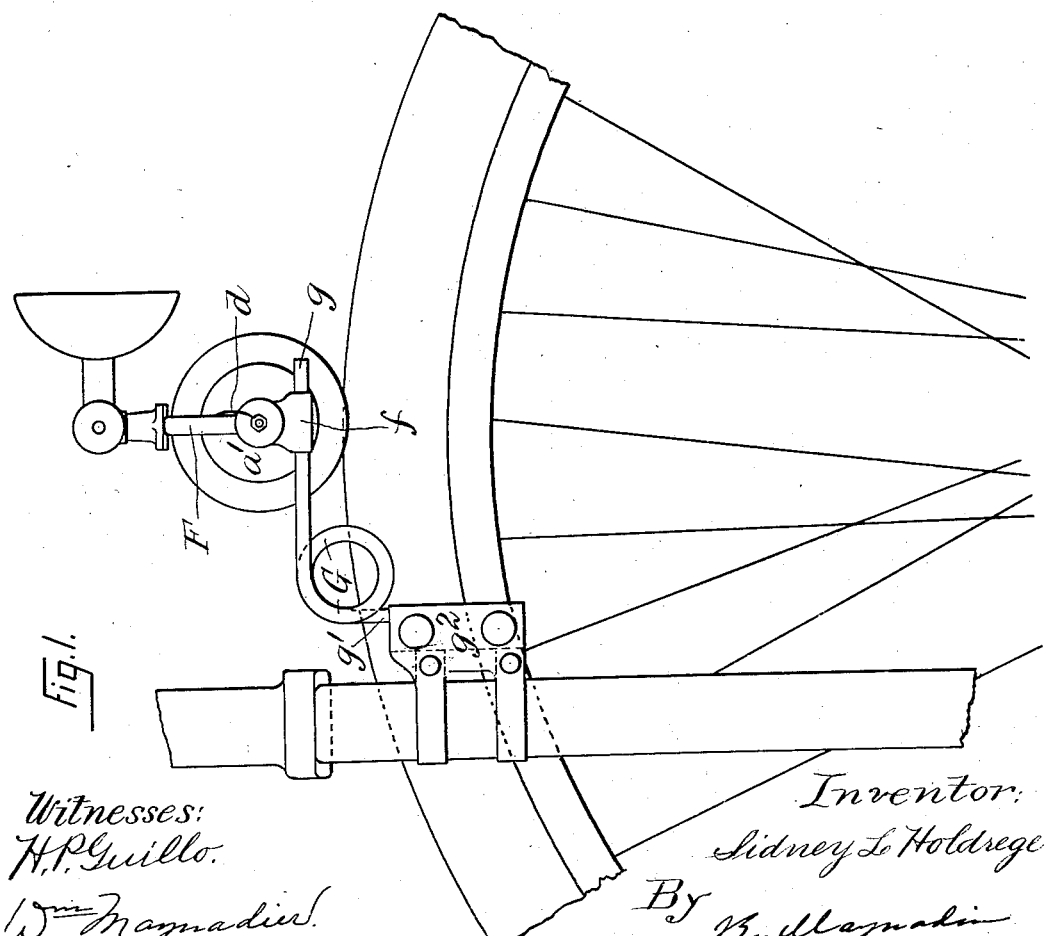

No. 643,095. Patented Feb. 6, 1900.
S. L. HOLDREGE.
MAGNETO ELECTRIC LIGHTING APPARATUS FOR BICYCLES.
(Application filed June 30, 1898. Renewed Jan. 15, 1900.)

(No Model.) 2 Sheets—Sheet 2.

Witnesses:
H. P. Guillo.
Wm Maynadier.

Inventor:
Sidney L. Holdrege
By
Attorney.

UNITED STATES PATENT OFFICE.

SIDNEY LATHAM HOLDREGE, OF BOSTON, MASSACHUSETTS, ASSIGNOR, BY MESNE ASSIGNMENTS, TO THE DOWD ELECTRICAL COMPANY, OF NEW YORK, N. Y.

MAGNETO-ELECTRIC LIGHTING APPARATUS FOR BICYCLES.

SPECIFICATION forming part of Letters Patent No. 643,095, dated February 6, 1900.

Application filed June 30, 1898. Renewed January 15, 1900. Serial No. 1,482. (No model.)

*To all whom it may concern:*

Be it known that I, SIDNEY LATHAM HOLDREGE, of Boston, in the county of Suffolk and State of Massachusetts, have invented an Improved Magneto-Electric Lighting Apparatus for Bicycles and other Vehicles, of which the following is a specification, reference being had to the accompanying drawings, in which—

Figure 3:
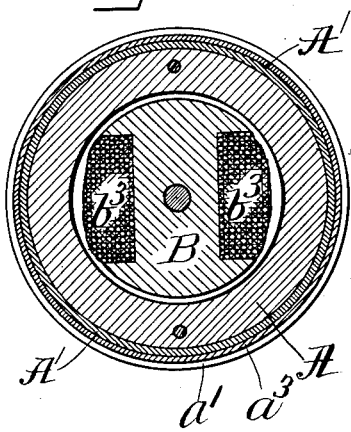
Figure 4:
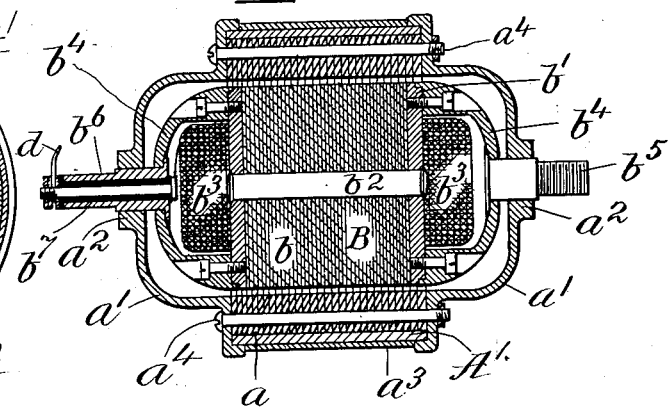
Figure 5:
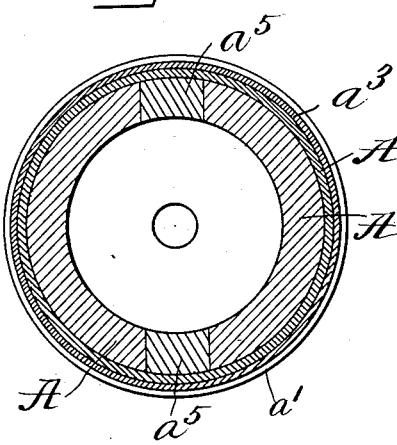
Figure 6:
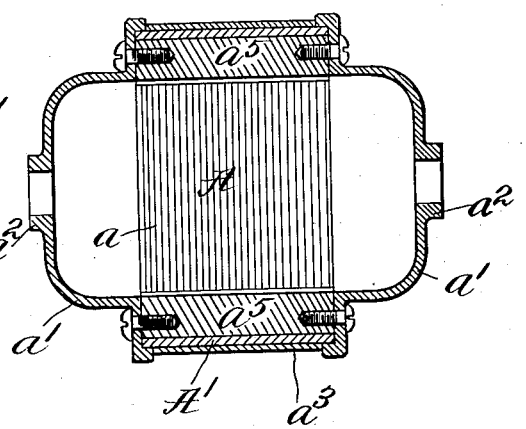

Figure 1 is a side elevation, and Fig. 2 a front elevation, of my apparatus, illustrating it as applied to a bicycle. Fig. 3 is a section on line 3 3 of Fig. 2. Fig. 4 is a section on line 4 4 of Fig. 2. Figs. 5 and 6 are sectional views of a modified form of my magnet.

My invention relates mainly to a magneto-electric generator which is light, compact, and dust-proof and otherwise adapted to be supported on and driven by the motion of a bicycle or other vehicle and which is adapted to generate a current sufficient to heat the filament of the lamp to incandescence at ordinary speeds of the bicycle or other vehicle without unduly overheating that filament at high speeds.

The features of my invention consist, first, in a new permanent field-magnet; secondly, in a new armature of the Siemens type; thirdly, in a yoke extending across the generator and rigidly connected with the two studs which project from the armature and upon which the field-magnet revolves, so that the yoke is the frame of the generator, and, fourthly, in a spring connection between the frame of the generator and the frame of the bicycle.

The field-magnet A is composed of individual permanent magnets $a$, each so shaped that when compounded they form a cylinder, (clearly shown in Figs. 3 and 4,) and each individual magnet is preferably in the form of a ring or part of a ring in order that they may be punched out of sheet-steel. This cylindrical group of magnets $a$ is inclosed by the case A', of non-magnetic material, and is secured between the two caps $a'$, and these caps are provided each with a hollow projection $a^2$, which projections serve as journal-boxes. This magnet is the first feature of my invention, and its main advantages are that it is inexpensive, can be made of ample strength, is admirably adapted to be rotated by contact of the rubber tire $a^3$ about the case A' with the bicycle-tire, and effectively shields all the parts within it from dust and dirt.

In the preferred form of my magnet the individual magnets are complete rings, each formed with a hole at each pole for the screws or rods $a^4$, by which the magnet is connected to the caps; but my magnet may be made of parts of rings and soft-iron rods $a^5$ used between the polarized ends of the individual magnets and the caps be connected by screws engaging with the rods $a^5$. The object of this subfeature of my invention is to obtain a solid connection between the caps, whether of the form shown or of any other form, and the cylindrical magnet.

The armature-core B is composed of laminæ $b$ of thin sheet-iron held together by two thicker plates $b'$, also, preferably, of soft iron, which are united by the rod $b^2$, upset at its ends or otherwise secured to the plates $b'$. The wires for the armature-coil $b^3$ are wound in the grooves of the core B, as usual; but the windings extend over the plates $b'$, as seen in Fig. 4, and are held sidewise by the thickened portions of the caps $b^4$.

In winding the core I prefer to connect temporary side pieces shaped like the thickened portions of the caps $b^4$ to the armature-core B and remove these temporary side pieces after the winding is completed and before applying the caps $b^4$. The caps $b^4$ carry the studs $b^5$ $b^6$, one of which, $b^6$, is hollow and contains the insulating-bushing $b^7$, through which one end of the coil $b^3$ is electrically connected with the insulated conductor $d$, leading to one terminal of the lamp D. The other terminal of the coil $b^3$ is electrically connected to the armature-core B or caps $b^4$, as usual, and the other terminal of lamp D is electrically connected to yoke F or any other part of the machine which is not insulated from core B or caps $b^4$, as will be clear without detailed description. This armature composed of sheet-iron plates connected together by one or more rods wound with coil $b^3$ and provided with caps $b^4$, carrying studs $b^5 b^6$, is the second feature of my invention. The caps $b^4$ are shaped to allow the coil $b^3$ to extend over each end of the core B and yet securely hold the studs $b^5 b^6$ in line with the axis of core B, and the whole construction results in an "armature" (meaning by that term a core, its coil, and its shaft) which is substantially new and far superior to any other construction of which I am aware both mechanically and electrically, for the quantity of soft iron in the core B may be ample and the proper length of wire may be used without the objections incident to using too small a wire, and these are considerations of vital importance in view of the fact that the number of revolutions of the moving part of the generator must necessarily vary very largely, and the lamp D must glow with a minimum number of revolutions and yet not be overstrained by the maximum number.

It will now be clear that in my improved magneto-generator the armature may revolve and the field be fast to the frame, or vice versa, as shown in the drawings; but for use on bicycles it is far better to revolve the field, and for this reason I use a yoke F for the frame, in which the studs $b^5$ and $b^6$ are made fast, and provide that yoke F with means by which it may be connected with the forks of the bicycle. I prefer to use clamp-sleeves $f$ at the ends of yoke F, which hold the horizontal arms $g$ of a stout wire spring G, the vertical arms $g'$ of that spring being connected each by its clamp $g^2$ with one of the forks of the bicycle.

While my yoke-frame is especially adapted for the spring-support shown, which constitutes the fourth portion of my invention, it is obvious that either of these two features may be used singly, and that is also true of the first and second features of my invention, for my field-magnet may be used with many other forms of armature and my armature may be used with many other forms of field-magnet.

What I claim as my invention is—

1. The field-magnet above described made up of a magnetic cylinder secured between two caps of non-magnetic material each having an axial bore, and an inner concave surface, substantially as described.

2. In combination a cylindrical compound magnet; a cylindrical case holding the magnet; and two concavo-convex caps of non-magnetic material each with an axial bore, and each secured to the cored magnet with its concave surface next to the magnet, substantially as described.

3. In combination a magneto-generator; the springs G; means for connecting one arm of each spring with the frame of the generator; and means for connecting the other arm of each spring to a vehicle, all substantially as described.

SIDNEY LATHAM HOLDREGE.

Witnesses:
 JOHN R. SNOW,
 H. P. GUILLO.